United States Patent
Park et al.

(10) Patent No.: US 7,532,278 B2
(45) Date of Patent: May 12, 2009

(54) LIQUID CRYSTAL DISPLAY APPARATUS

(75) Inventors: Min-Wook Park, Seongnam-si (KR);
Young-Goo Song, Cheonan-si (KR);
In-Woo Kim, Suwon-si (KR);
Sang-Heon Song, Cheonan-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 109 days.

(21) Appl. No.: 11/777,685

(22) Filed: Jul. 13, 2007

(65) Prior Publication Data
US 2008/0043163 A1    Feb. 21, 2008

(30) Foreign Application Priority Data
Aug. 21, 2006    (KR) .................... 10-2006-0078913

(51) Int. Cl.
*G02F 1/1333*    (2006.01)

(52) U.S. Cl. .................. 349/110; 349/130; 349/44

(58) Field of Classification Search ................. 349/110, 349/122, 129, 130, 43, 44, 192
See application file for complete search history.

(56) References Cited

U.S. PATENT DOCUMENTS 7,113,233 B2 * 9/2006 Lyu .............................. 349/38
2008/0192165 A1 * 8/2008 Nakagawa et al. ............ 349/55

* cited by examiner

*Primary Examiner*—Hemang Sanghavi
(74) *Attorney, Agent, or Firm*—H.C. Park & Associates, PLC

(57) ABSTRACT

Disclosed is a liquid crystal display apparatus including a first substrate, a second substrate, and a liquid crystal layer interposed between the first substrate and the second substrate. A pixel area is defined on the first substrate. A pixel electrode includes a cut-out pattern and is formed in the pixel area. A conductive pattern is disposed between the first substrate and the pixel electrode, and partially overlaps the cut-out pattern when viewed from a plan view. A common electrode is disposed on the second substrate and includes a domain divider dividing the pixel area into a plurality of domains. A light blocking member is disposed on one of the first substrate and the second substrate, and is positioned corresponding to a portion of areas in which the cut-out pattern overlaps the conductive pattern within the pixel area.

24 Claims, 13 Drawing Sheets

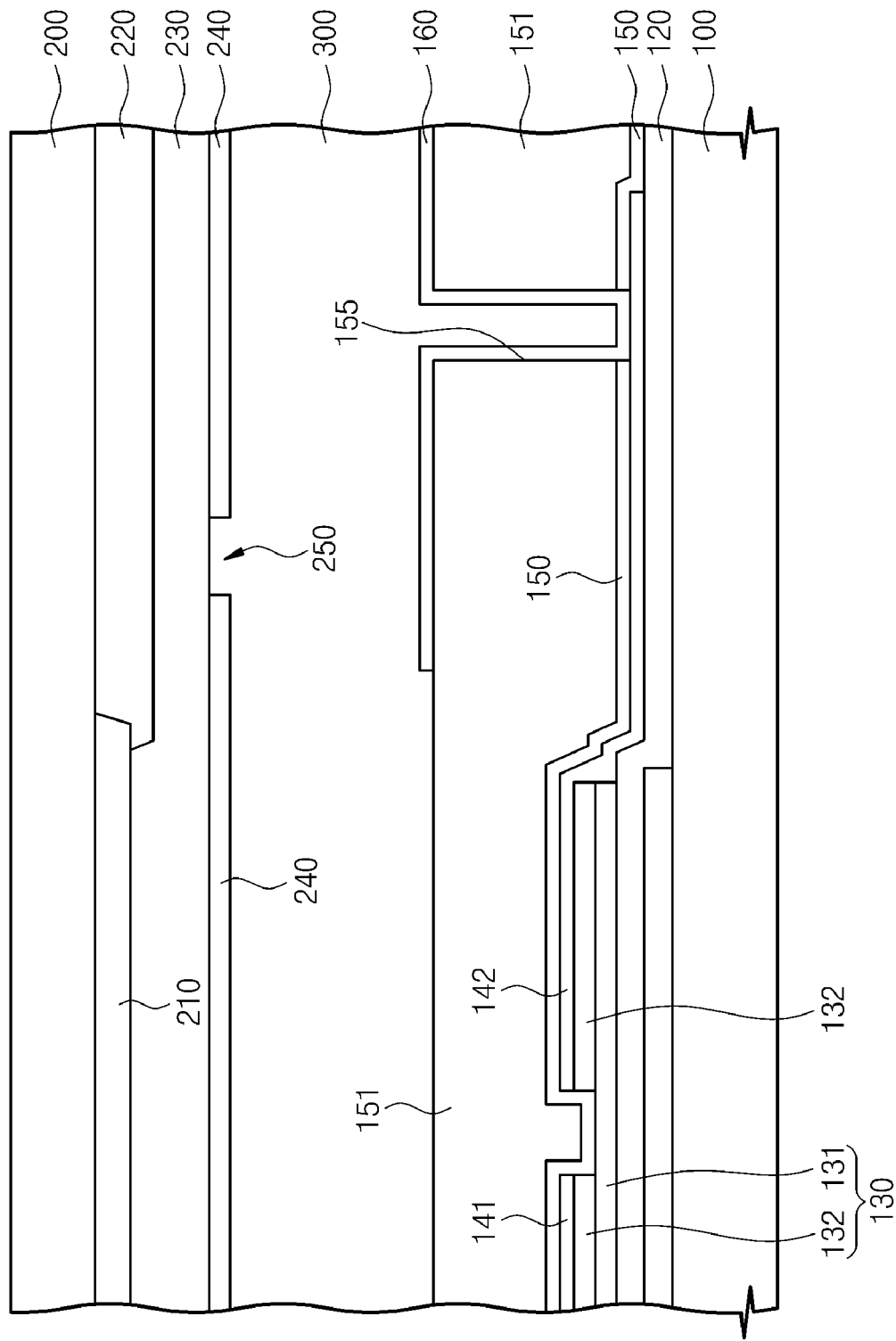

LIQUID CRYSTAL DISPLAY APPARATUS

CROSS-REFERENCE TO RELATED APPLICATION

This application claims priority from and the benefit of Korean Patent Application No. 10-2006-0078913, filed on Aug. 21, 2006, which is hereby incorporated by reference for all purposes as if fully set forth herein.

BACKGROUND OF THE INVENTION

1. Field of the Invention

The present invention relates to a display apparatus. More particularly, the present invention relates to a liquid crystal display apparatus, which uses liquid crystals.

2. Discussion of the Background

A liquid crystal display apparatus uses liquid crystals in a mesomorphic phase between a liquid phase and a solid phase. The liquid crystal display apparatus includes two substrates, and a liquid crystal layer, in which liquid crystals are aligned, is interposed between the two substrates.

Since the liquid crystals have dielectric anisotropy, the alignment of the liquid crystals changes when an electric field is applied thereto. In addition, since the liquid crystals have refractive anisotropy, the light transmittance of the liquid crystal display apparatus varies according to the alignment state of the liquid crystals. Accordingly, the liquid crystal display apparatus adjusts the alignment of the liquid crystals using an electric field and an image corresponding to the alignment state of the liquid crystals may be displayed.

The two substrates of the liquid crystal display apparatus are provided with electrodes thereon that generate an electric field to be applied to the liquid crystals. Different voltages are provided to the electrodes, creating an electric field that is applied to the liquid crystals. However, the two substrates are provided with a variety of conductive patterns thereon in addition to the electrodes. For example, metal interconnections may be formed on the substrates in order to transmit signals. The electric field may be distorted by the conductive patterns. If the electric field is distorted, the alignment of the liquid crystals may deteriorate, such that images are not properly displayed and image quality is degraded.

SUMMARY OF THE INVENTION

The present invention provides a liquid crystal display apparatus that may display high-quality images.

Additional features of the invention will be set forth in the description which follows, and in part will be apparent from the description, or may be learned by practice of the invention.

The present invention discloses a liquid crystal display apparatus including a first substrate, a second substrate, a liquid crystal layer, a pixel electrode, a conductive pattern, a common electrode, and a light blocking member. A pixel area is defined on the first substrate. The second substrate faces the first substrate and the liquid crystal layer is interposed between the first substrate and the second substrate. The pixel electrode is positioned in the pixel area on the first substrate and includes a cut-out pattern defined by removing a portion of the pixel electrode. The conductive pattern is arranged between the first substrate and the pixel electrode and partially overlaps the cut-out pattern when viewed from a plan view. The common electrode is disposed on the second substrate. The light blocking member is arranged on one of the first substrate and the second substrate and is positioned corresponding to areas in which the cut-out pattern overlaps the conductive pattern within the pixel area.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which are included to provide a further understanding of the invention and are incorporated in and constitute a part of this specification, illustrate embodiments of the invention, and together with the description serve to explain the principles of the invention.

FIG. 4A and FIG. 4B are sectional views taken along lines I-I' and II-II' of FIG. 1 according to another exemplary embodiment of the present invention.

DETAILED DESCRIPTION OF THE ILLUSTRATED EMBODIMENTS

Figure 1:
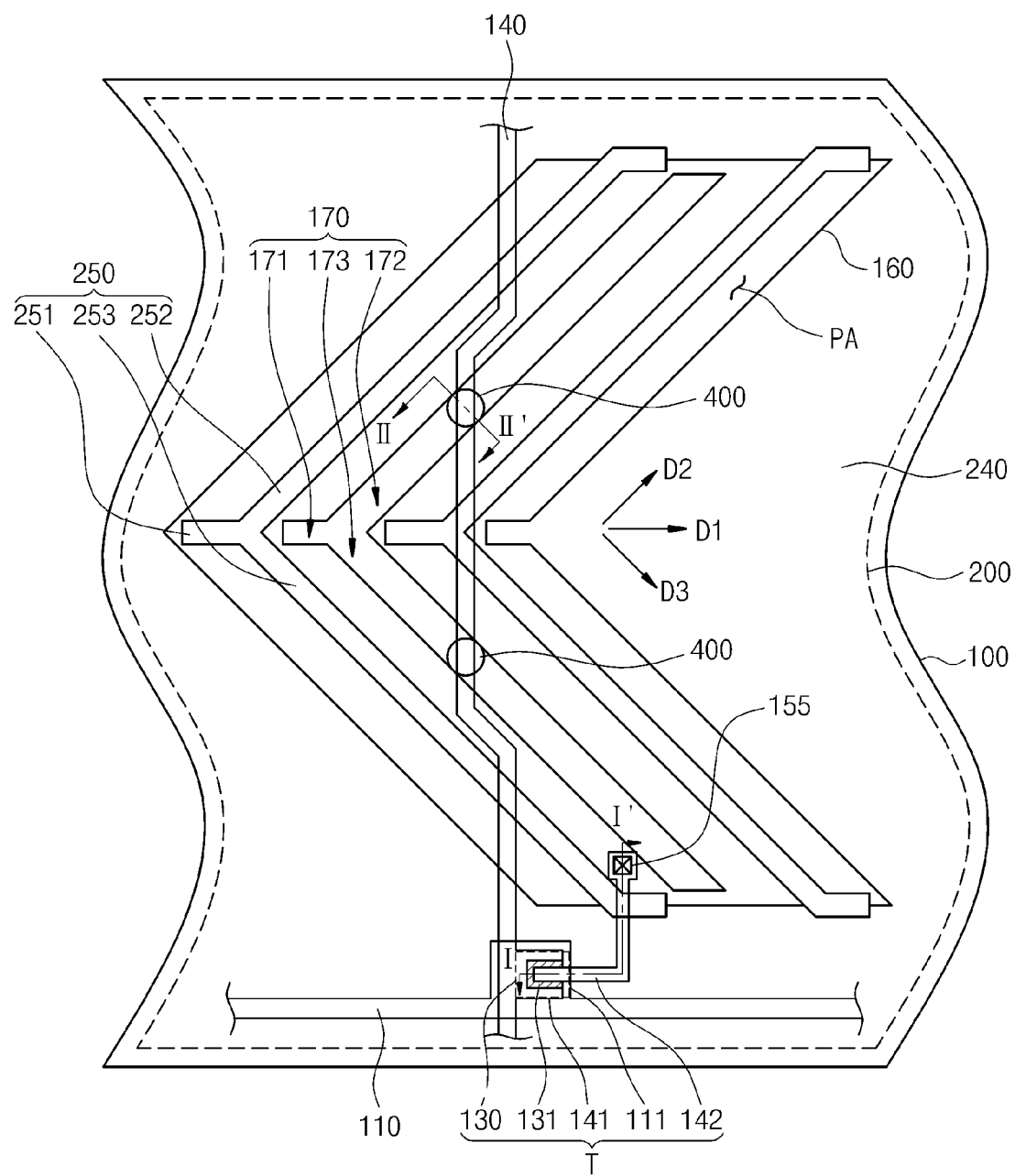
FIG. 1 is a plan view showing the structure of a liquid crystal display apparatus according to one exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a plan view showing the structure of a liquid crystal display apparatus according to one exemplary embodiment of the present invention. The liquid crystal display apparatus includes a plurality of pixel areas having the same structure. Thus, the following description will focus on one pixel area, unless otherwise stated.

Referring to FIG. 1, first and second substrates 100 and 200 are provided in the liquid crystal display apparatus. A pixel area PA, which is a minimum unit for displaying an image, is defined on the first substrate 100. A pixel electrode 160 is formed on the first substrate 100 and positioned in the pixel area PA. In addition, the pixel electrode 160 is provided with a cut-out pattern 170 defined by removing a portion thereof. Several conductive layer patterns, including a gate line 110 and a data line 140, are formed between the first substrate 100 and the pixel electrode 160.

The gate line 110 is insulated from the data line 140 and crosses the data line 140. The gate line 110 is positioned at a boundary of the pixel area PA and extends linearly in a predetermined direction. The data line 140 passes through the pixel area PA. In addition, a thin film transistor T is provided on the pixel area PA. The thin film transistor T includes a gate electrode 111, a source electrode 141, and a drain electrode 142. The gate electrode 111 branches from the gate line 110. The source electrode 141 branches from the data line 140. The drain electrode 142 is spaced apart from the source electrode 141 and connected to the pixel electrode 160.

While the gate line 110 extends in a first direction D1, the pixel electrode 160 extends in a zigzag manner in second and third directions D2 and D3, which are symmetrical to each other with respect to the first direction D1. For the purpose of convenience of explanation, the portion extending in the second direction D2 is called a "right inclination portion" and the portion extending in the third direction D3 is called a "left inclination portion." In this case, the right and left inclination portions form a basic electrode. The pixel electrode 160 includes at least one basic electrode.

In detail, as shown in FIG. 1, the pixel electrode 160 may include two basic electrodes. In this case, the two basic electrodes are separated from each other inside the pixel area PA and connected to each other at the peripheral portion of the pixel area PA.

Alternatively, the pixel electrode 160 may include only one basic electrode or three basic electrodes. Further, the pixel area PA of the liquid crystal display apparatus may be asymmetrically designed. In this case, the pixel electrode 160 includes a single basic electrode in some pixel areas and at least two basic electrodes in other pixel areas.

The cut-out pattern 170 is formed in the pixel area PA between the two basic electrodes. Accordingly, the cut-out pattern 170 is formed to extend in the second and third directions D2 and D3 in which the pixel electrode 160 extends. Further, the cut-out pattern 170 may additionally be formed to extend in the first direction D1 in an area where the right inclination portion meets the left inclination portion.

A common electrode 240 is formed on the second substrate 200. The common electrode corresponds to the pixel electrode 160 and includes a domain divider 250. The domain divider 250 is positioned at the center of the basic electrodes and formed to extend in the second and third directions D2 and D3. Further, the domain divider 250 may additionally be formed to extend in the first direction D1 in an area where the portion formed in the second direction D2 meets the portion in the third direction D3.

Hereinafter, for convenience, the cut-out pattern 170 is classified into first, second, and third cut-out patterns 171, 172, and 173 corresponding to the portions of the cut-out pattern 170 extending direction in the first, second, and third direction, respectively, and the domain divider 250 is classified into first, second, and third domain dividers 251, 252, and 253 corresponding to the portions of the domain divider 250 extending in the first, second, and third directions, respectively.

Figure 2A:
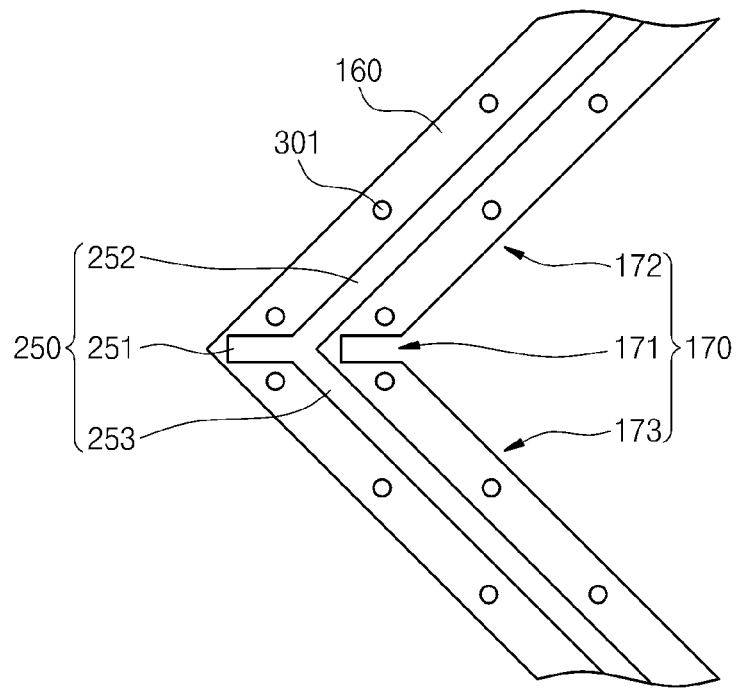
FIG. 2A and FIG. 2B are plan views showing the operational procedure of the liquid crystal display apparatus shown in FIG. 1.
Figure 2B:
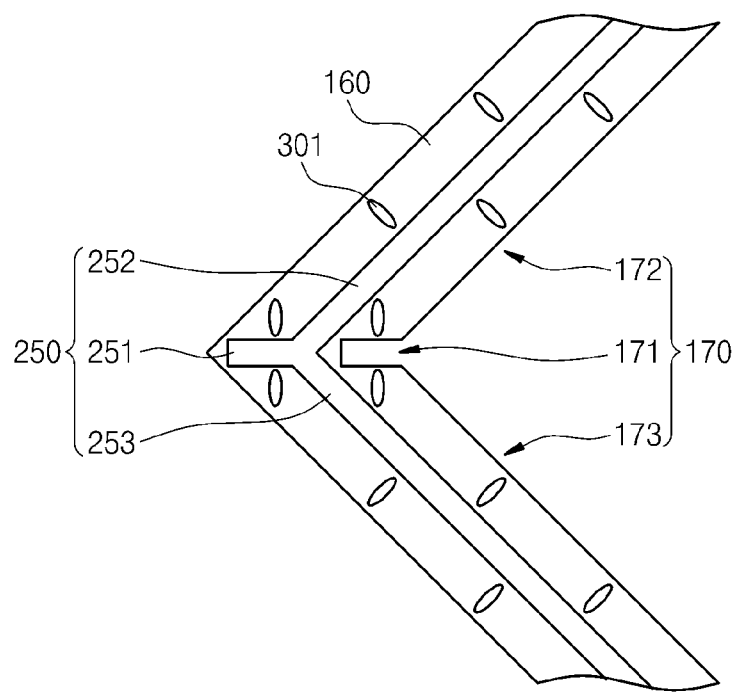

FIG. 2A and FIG. 2B are plan views showing the operational procedure of the liquid crystal display apparatus shown in FIG. 1.

Referring to FIG. 2A, liquid crystals 301 are aligned between the first and second substrates 100 and 200. The liquid crystals 301 have an oval shape including a long axis and a short axis. The alignment direction of the liquid crystals 301 is defined by the direction of the long-axis. Here, the liquid crystals 301 are aligned perpendicularly to the first and second substrates 100 and 200. In this alignment state, the liquid crystals 301 do not subject light passing through the liquid crystals 301 to phase variation. Two polarizing plates (not shown), which have absorption axes perpendicular to each other, are attached to outer portions of the first and second substrates 100 and 200. Accordingly, since light is linearly polarized when it passes through the polarizing plate attached to the outer portion of the first substrate 100, the light does not pass through the polarizing plate attached to the outer portion of the second substrate 200. Therefore, the liquid crystal display apparatus is in a black state.

Referring to FIG. 1 and FIG. 2B, when the liquid crystal display apparatus is operated, a gate signal is transmitted to the gate line 110, so that the thin film transistor T is turned on. A data signal corresponding to image information is transmitted to the data line 140, and a data voltage is applied to the pixel electrode 160 through the thin film transistor T. At the same time, a common voltage, which is different from the data voltage, is applied to the common electrode 240. An electric field is generated between the first and second substrates 100 and 200 due to the difference between the data voltage and the common voltage. The liquid crystals 301 are tilted with respect to the first and second substrates 100 and 200 by the electric field.

In this alignment state, the liquid crystals 301 subject the light passing through the liquid crystal 301 to phase variation. The phase variation value of the light varies depending on the degree at which the liquid crystals 301 are tilted. In addition, the degree at which the liquid crystals 301 are tilted is determined according to the intensity of the electric field. The light that is linearly polarized when it passes through the polarizing plate attached to the outer portion of the first substrate 100 is subject to phase variation when it passes through the liquid crystals 301. Light having a changed phase passes through the polarizing plate attached to the outer portion of the second substrate 200 so that an image is displayed.

The domain divider 250 may be a cut-out pattern formed by removing a portion of the common electrode 240 or a protrusion formed as an insulator on the common electrode 240. Since the common voltage cannot be applied to the cut-out pattern or the protrusion, the intensity and/or the direction of the electric field may be distorted. As a result, the domain divider 250 changes the alignment direction of the liquid crystals 301 at both sides thereof. The distorted electric field symmetrically appears at both sides of the cut-out pattern or the protrusion.

The cut-out pattern 170 formed in the pixel electrode 160 operates similarly to the domain divider 250 in that the cut-out pattern 170 cannot receive the data voltage. Accordingly, the domain divider 250 and the cut-out pattern 170 change the alignment direction of the liquid crystals 301 in each area. Hereinafter, each area defined according to the alignment direction of the liquid crystals 301 is referred to as a "domain".

The second and third cut-out patterns 172 and 173 make up most of the area of the cut out pattern 170. The second and third domain dividers 252 and 253 make up most of the area of the domain divider 250. The second and third cut-out patterns 172 and 173 and the second and third domain dividers 252 and 253 divide the pixel area PA into a plurality of domains.

The first cut-out pattern 171 prevents the liquid crystals 301 aligned in the vicinity of the second and third cut-out patterns 172 and 173 from being scattered due to the influence of the second and third cut-out patterns 172 and 173. The first domain divider 251 operates similarly to the first cut-out pattern 171 in the vicinity of the second and third domain dividers 252 and 253. The first cut-out pattern 171 and the first domain divider 251 are optionally used.

The liquid crystals 301 may be aligned in different directions according to each domain, so that the optical characteristics of the liquid crystals 301 are compensated for in each domain. Accordingly, the viewing angle of the liquid crystal display apparatus may be widened and the operational characteristics of the liquid crystal display apparatus may be improved.

Referring again to FIG. 1, since the data line 140 passes through the pixel area PA, the data line 140 may overlap the cut-out pattern 170 in the pixel area PA. A light blocking member 400 may be mounted on one of the first and second substrates 100 and 200 in this overlapping area. The light blocking member 400 blocks the transmittance of light in a corresponding area so that degradation of the image quality may be prevented. Hereinafter, the operational procedure of the light blocking member 400 will be described.

As described above, the alignment of the liquid crystals 301 is adjusted according to an electric field generated by voltages applied to the pixel electrode 160 and the common electrode 240. However, when the liquid crystal display apparatus is operated, a data signal is transmitted to the data line 140 causing an electric field to be generated from the data line 140. The electric field generated from the data line 140 causes the liquid crystals 301 to align abnormally, resulting in degradation of image quality.

In the overlapping area formed between the pixel electrode 160 and the data line 140 when viewed in a plan view, the pixel electrode 160 serves as a kind of shielding electrode and shields the liquid crystals 301 from the electric field generated from the data line 140. As a result, the electric field generated from the data line 140 may not affect the liquid crystals 301. However, there may be no shielding effect in an area where a portion of the pixel electrode 160 is removed. Accordingly, the electric field generated from the data line 140 abnormally aligns the liquid crystals 301 in the corresponding area, thereby degrading image quality.

According to the present exemplary embodiment, the light blocking member 400 is mounted on an area where the electric field generated from the data line 140 may abnormally align the liquid crystals 301 so as to block the transmittance of light in the area, which may prevent degradation of image quality. Hereinafter, the vertical arrangement of, the material of, and a scheme of forming the light blocking member 400 in the liquid crystal display apparatus will be described with reference to accompanying drawings.

Figure 3A:
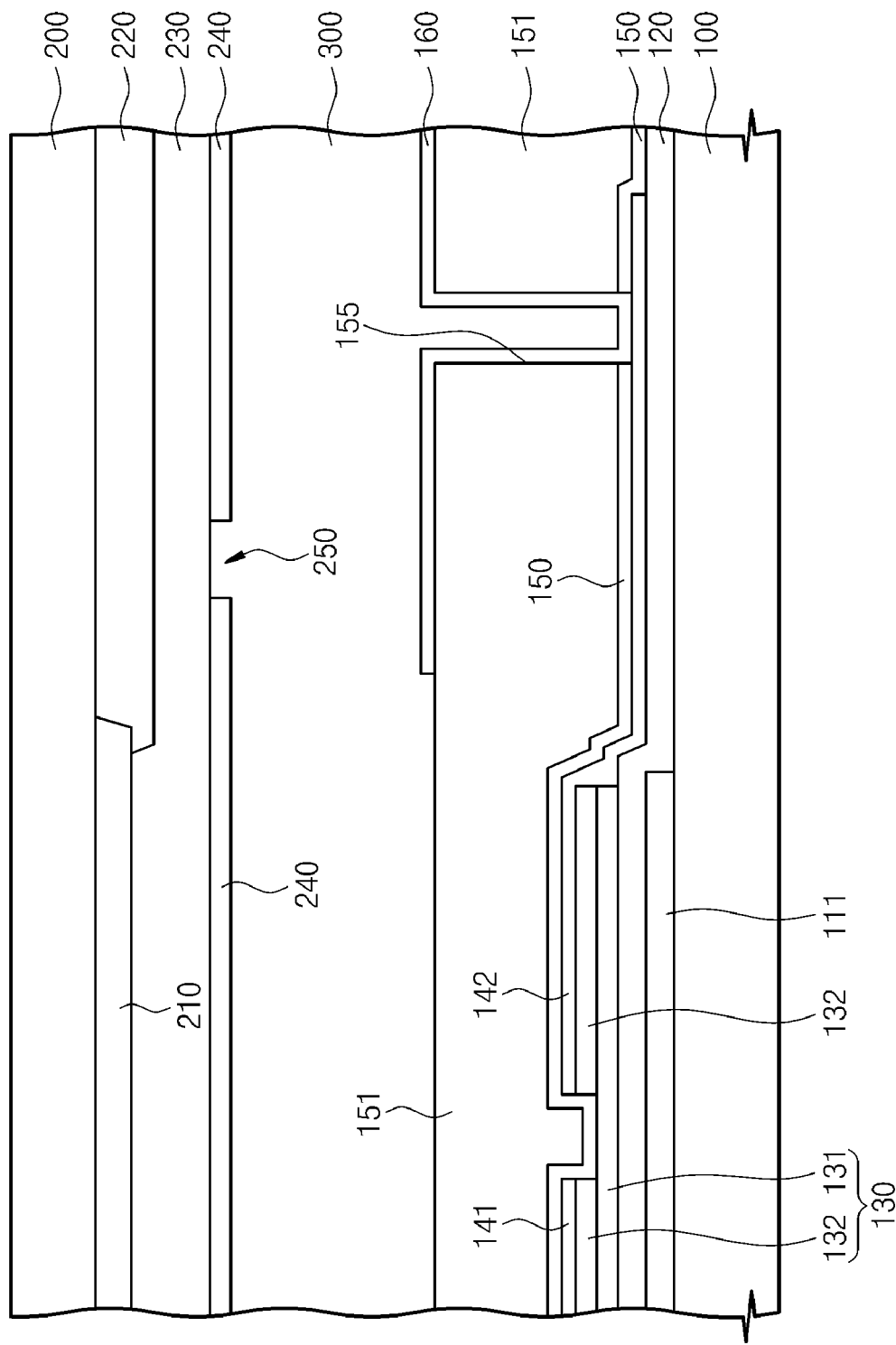
FIG. 3A and FIG. 3B are sectional views taken along lines I-I' and II-II' of FIG. 1.
Figure 3B:
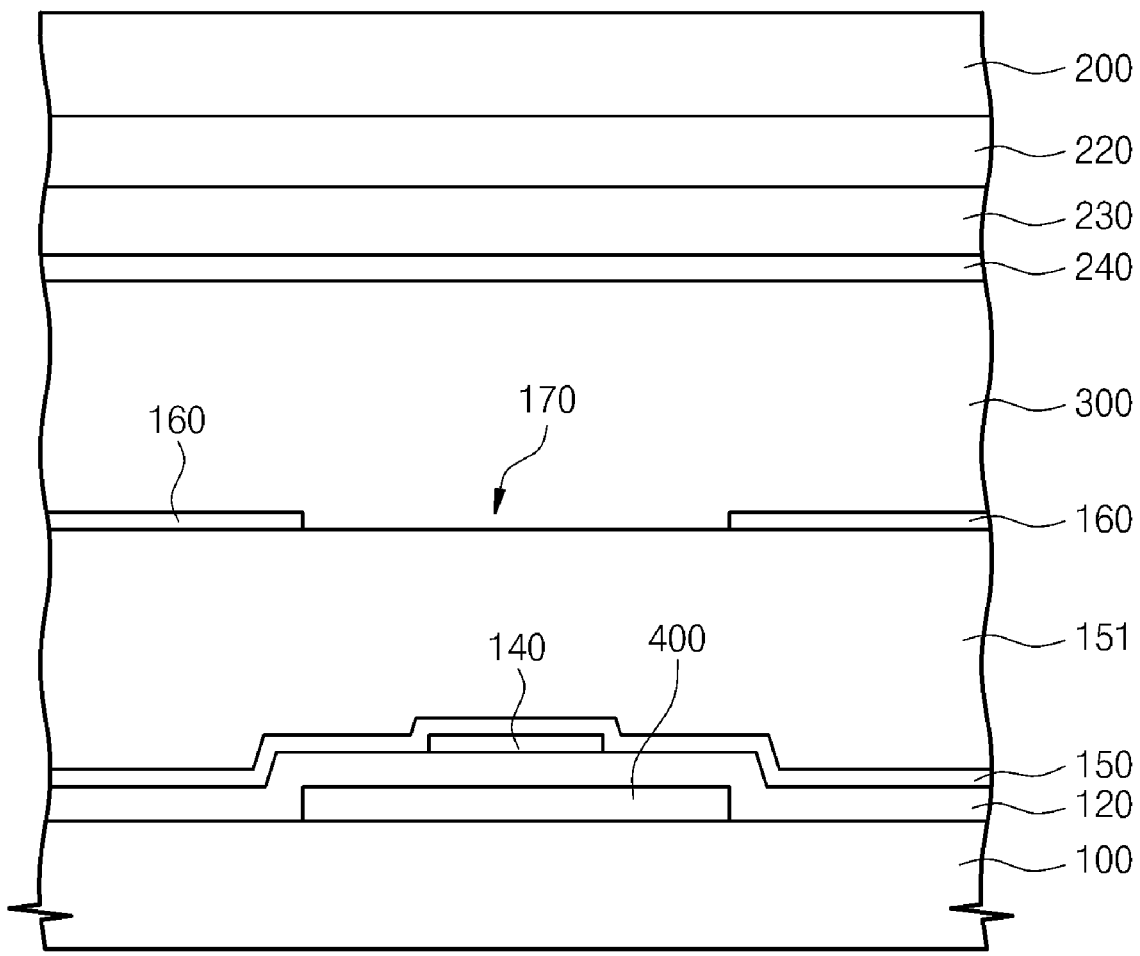

FIG. 3A and FIG. 3B are sectional views taken along lines I-I' and II-II' of FIG. 1.

Referring to FIG. 3A, the gate electrode 111 is formed on the first substrate 100. A gate insulating layer 120 is formed on the first substrate 100 and the gate electrode 111. Semiconductor pattern 130 is formed on the gate insulating layer 120 in an area formed with the gate electrode 111. The semiconductor pattern 130 includes an active pattern 131 having an intrinsic semiconductor and an ohmic contact pattern 132 doped with impurities. The ohmic contact pattern 132 is divided into two parts, and the source electrode 141 and the drain electrode 142 are formed on the two parts of the ohmic contact pattern 132.

Protection layers 150 and 151 are formed on the source electrode 141 and the drain electrode 142 such that the protection layers 150 and 151 cover the entire surface of the first substrate 100. The protection layers 150 and 151 include an inorganic protection layer 150 and an organic protection layer 151. The protection layers 150 and 151 have a contact hole 155 that exposes the drain electrode 142. The pixel electrode 160 is formed on the protection layers 150 and 151 and is connected to the drain electrode 142 through the contact hole 155.

The organic protection layer 151 may have a thickness of several micrometers so as to prevent coupling between the data line 140 and the pixel electrode 160. The organic protection layer 151 is not essential, but optional. However, since coupling between the data line 140 and the pixel electrode 160 increases in the structure when the data line 140 passes through the pixel area PA and overlaps the pixel electrode 160, the organic protection layer 151 may be beneficial.

A light blocking layer pattern 210, a color filter 220, an overcoat layer 230, and a common electrode 240 are formed on the second substrate 200. The light blocking layer pattern 210 is formed at the boundary of the pixel area PA and at an area corresponding to the thin film transistor T so as to block the light at the corresponding areas. The color filter 200 is formed on the light blocking layer pattern 210 to display color images by filtering light into the three primary colors of red, green, and blue. The overcoat layer 230 planarizes the step difference of the second substrate 200 occurring due to the light blocking layer pattern 210 and the color filter 220. The overcoat layer 230 also acts to protect the color filter 220. The common electrode 240 is formed on the overcoat layer 230 and includes the domain divider 250, which may be formed by removing a predetermined portion of the common electrode 240.

Referring to FIG. 3B, the light blocking member 400 is formed between the first substrate 100 and the gate insulating layer 120. The data line 140 is formed on the gate insulating layer 120 corresponding to the light blocking member 400. The light blocking member 400 has a width that is wider than that of the data line 140. The protection layers 150 and 151 are formed on the data line 140, and the pixel electrode 160 is formed on the upper part of the protection layer 151. The pixel electrode 160 includes the cut-out pattern 170 corresponding to the data line 140.

Accordingly, the data line 140 is not covered by the pixel electrode 160, and the electric field generated from the data line 140 is not blocked by the pixel electrode 160 and is applied to the liquid crystal layer 300. However, since the light blocking member 400 blocks the light incident from the bottom of the first substrate 100, an image is not displayed in the blocking area.

As shown in FIG. 3A, the gate electrode 111 is formed between the first substrate 100 and the gate insulating layer 120. Therefore, the light blocking member 400 is arranged in the same layer as the gate electrode 111 when viewed in a vertical structure. The light blocking member 400 and the gate electrode 111 may be formed through the same process.

The gate electrode 111 may include aluminum based metal such as aluminum (Al) or aluminum alloy, silver based metal such as silver (Ag) or silver alloy, copper based metal such as copper (Cu) or copper alloy, molybdenum based metal such as molybdenum (Mo) or molybdenum alloy, chrome (Cr), tantalum (Ta), and/or titanium(Ti). The gate electrode 111 may include multiple layers including metal having different physical properties. For example, one conductive layer may include metal having low specific resistance such that signal delay or voltage drop may be reduced, and the other conductivity layer may include metal having superior physical, chemical, and electrical contact characteristics between the gate electrode 111 and other materials making contact with the gate electrode 111.

Since the above metal for the gate electrode 111 may have light blocking characteristics, the light blocking member 400 may include the same material as the gate electrode 111. In this case, the gate electrode 111 and the light blocking member 400 may be formed through the same process, and an additional process of forming the light blocking member 400 may be omitted so that the number of processing steps may be reduced.

For example, the gate electrode 111 and the light blocking member 400 may be simultaneously formed by the following steps. A conductive layer is formed on the first substrate 100. A photoresist film is coated on the conductive layer. The photoresist film is exposed to a UV light and developed to form a photoresist film pattern. The photoresist film exposes a region corresponding to the gate electrode 111 and the light blocking member 400. The conductive layer is etched using the photoresist film pattern to form the gate electrode 111 and the light blocking member 400. Although the light blocking member 400 and the gate electrode 111 are formed through the same process using the same material, the light blocking member 400 is different from the gate electrode 111 in that the light blocking member 400 is a floating electrode insulated from a peripheral area. In other words, although the gate electrode 111 is connected to the gate line 110 such that a gate signal is applied to the gate electrode 111, the light blocking member 400 is insulated from a peripheral area such that the light blocking member 400 may only perform a light blocking function.

Figure 4B:
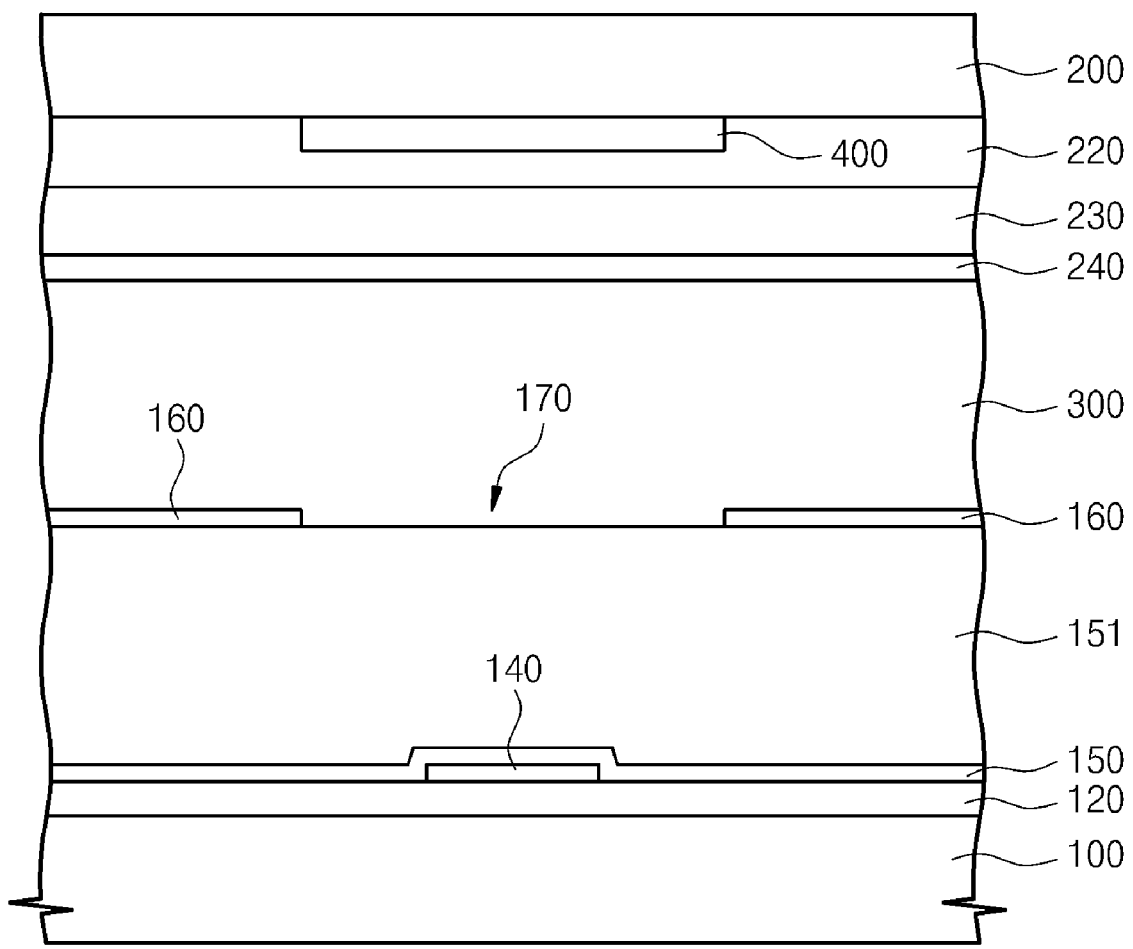

FIG. 4A and FIG. 4B are sectional views taken along lines I-I' and II-II' of FIG. 1 according to another exemplary embodiment of the present invention. According to the present exemplary embodiment, the same reference numerals will be assigned to the elements identical to those of the prior exemplary embodiment, and a detailed description thereof will be omitted in order to avoid redundancy.

Referring to FIG. 4A, the liquid crystal display apparatus according to the present invention includes the first and second substrates 100 and 200 and a liquid crystal layer 300 interposed there between. A light blocking layer pattern 210, a color filter 220, an overcoat layer 230, and a common electrode 240 are provided on the second substrate 200.

Referring to FIG. 4B, the light blocking member 400, the color filter 220, the overcoat layer 230, and the common electrode 240 are provided on the second substrate 200. The light blocking member 400 is positioned corresponding to an area where the data line 140 overlaps the cut-out pattern 170 of the pixel electrode 160 on the first substrate 100. The light blocking member 400 blocks light transmittance in the corresponding area so as to prevent degradation of image quality.

When comparing FIG. 4A with FIG. 4B, the light blocking member 400 is positioned between the second substrate 200 and the color filter 220, and this layered position on the second substrate 200 is the same for the light blocking layer pattern 210 when viewed in a vertical structure. Accordingly, the light blocking member 400 and the light blocking layer pattern 210 may be formed through the same process.

The light blocking layer pattern 210 may include a metal film, such as chrome, having an optical density of 3.5 or more and a carbon-based organic material. Since both the metal film and the organic material have light blocking characteristics, the light blocking member 400 may include the same material as the light blocking layer pattern 210. In this case, the light blocking layer pattern 210 and the light blocking member 400 may be formed through the same process, and an additional process of forming the light blocking member 400 may be omitted so that the number of the processing steps may be reduced.

For example, the light blocking layer pattern 210 and the light blocking member 400 may be formed simultaneously by depositing the organic material layer on the second substrate 200, exposing it to a UV light, and developing it to form the light blocking member 400 and the light blocking layer pattern 210.

Liquid crystal display apparatuses are classified as reflective types, transmissive types, and transflective types, and the present exemplary embodiment may be employed for all types of liquid crystal display apparatuses. When the reflective or the transflective liquid crystal display apparatus operates in a reflective mode, light is incident on the outer portion of the second substrate 200, reflected from a reflective electrode provided on the first substrate 100, and then output through the second substrate 200. In this case, the light does not pass through the first substrate 100. Accordingly, in order to block light in a predetermined area of the reflective or transflective liquid crystal display apparatus, a light blocking means must be formed on the second substrate 200. Since the light blocking member 400 according to the present exemplary embodiment is formed on the second substrate 200 and satisfies the condition, the present exemplary embodiment may be employed in either the reflective or transflective type. In addition, when the light blocking member 400 is formed on the first substrate 100, this liquid crystal display apparatus may be employed for the transmissive type.

Hereinafter, a liquid crystal display apparatus according to another exemplary embodiment of the present invention will be described. According to the present exemplary embodiment, the same reference numerals will be assigned to the elements identical to those of the prior exemplary embodiment, and a detailed description thereof will be omitted in order to avoid redundancy.

Figure 5:
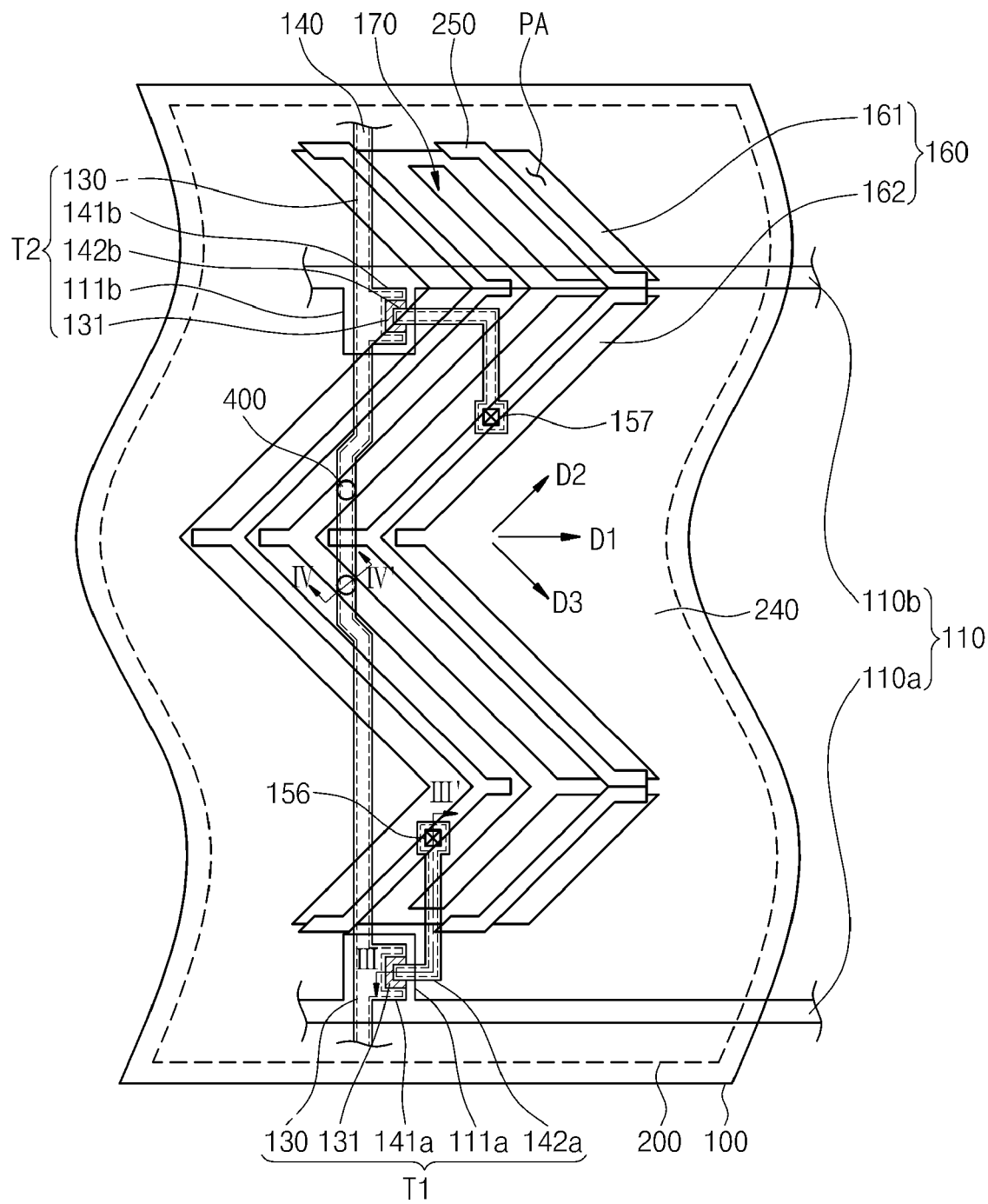
FIG. 5 is a plan view showing a liquid crystal display apparatus according to another exemplary embodiment of the present invention.

FIG. 5 is a plan view showing the liquid crystal display apparatus according to another exemplary embodiment of the present invention.

Referring to FIG. 5, the liquid crystal display apparatus includes first and second substrates 100 and 200. A plurality of pixel areas having the same structure is defined on the first substrate 100. The gate line 110 and the data line 140 are formed corresponding to each pixel area PA. A pixel electrode 160 is provided in each pixel area PA. The gate line 110 includes a first gate line 110a and a second gate line 110b spaced apart from each other, and the pixel electrode 160 includes a first pixel electrode 161 and a second pixel electrode 162 spaced apart from each other.

The first gate line 110a extends parallel to a short lateral side of the pixel electrode 160 at a boundary of the pixel area PA. The second gate line 110b passes through the pixel area PA parallel to the first gate line 110a. The data line 140 passes through the pixel area PA perpendicularly to the gate line 110. The data line 140 slants to the gate line 110 at a predetermined portion of the pixel area PA.

The first thin film transistor T1 is connected to the first gate line 110a and the data line 140. The first thin film transistor T1 includes a first gate electrode 111a branching from the first gate line 110a, a first source electrode 141a branching from the data line 140, and a first drain electrode 142a spaced apart from the first source electrode 141a and connected to the first pixel electrode 161 through the first contact hole 156.

In the same manner, a second thin film transistor T2 is connected to the second gate line 110b and the data line 140. The second thin film transistor T2 includes a second gate electrode 111b branching from the second gate line 110b, a second source electrode 141b branching from the data line 140, and a second drain electrode 142b separated from the second source electrode 141b and connected to the second pixel electrode 162 through the second contact hole 157.

While the gate line 110 extends in a first direction D1, the pixel electrode 160 extends in a zigzag manner in second and third directions D2 and D3, which are symmetrical to each other with respect to the first direction D1. For convenience of explanation, a portion extending in the second direction D2 is called a "right inclination portion" and a portion extending in the third direction D3 is called a "left inclination portion". In this case, the right and left inclination portions form a basic electrode. The second pixel electrode 162 includes one basic electrode. The first pixel electrode 161 includes a basic electrode corresponding to that of the second pixel electrode 162, a pair of half-sized right inclination portions that are formed at an upper portion of the basic electrode, and a pair of half-sized left inclination portions that are formed at a lower portion of the basic electrode 162.

The cut-out pattern 170 is positioned in an area defined between the first and second pixel electrodes 161 and 162. The common electrode 240 including the domain divider 250 is formed on the second substrate 200, and the pixel area PA is divided into a plurality of domains by the domain divider 250 and the cut-out pattern 170. The cut-out pattern 170 overlaps the data line 140, and the light blocking member 400 is formed in an area where the cut-out pattern 170 overlaps the data line 140.

According to the present exemplary embodiment, the light blocking member 400 blocks light at the area thereof such that degradation of image quality may be avoided. In addition, the pixel area PA is divided into a plurality of domains so that the viewing angle of the liquid crystal display apparatus may be widened, and the operational characteristics of the liquid crystal display apparatus may be improved. Different data voltages, which correspond to the same image information, are applied to the first and second pixel electrodes 161 and 162 through the first and second thin film transistors T1 and T2, respectively. The first and second pixel electrodes 161 and 162 complement each other due to the different data voltages, so that a high-quality image may be displayed.

Figure 6A:
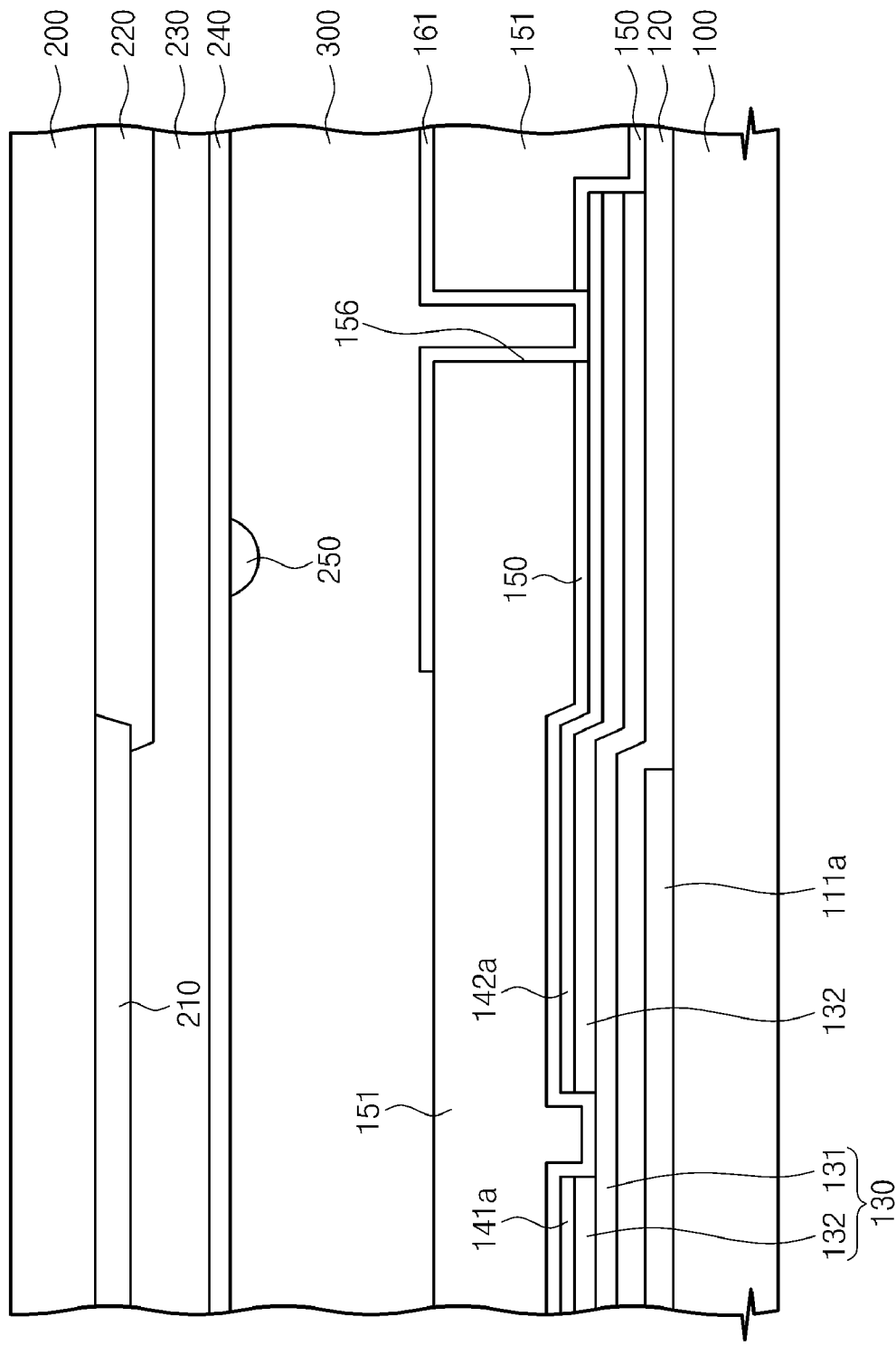
FIG. 6A and FIG. 6B are sectional views taken along lines III-III' and IV-IV' of FIG. 5.
Figure 6B:
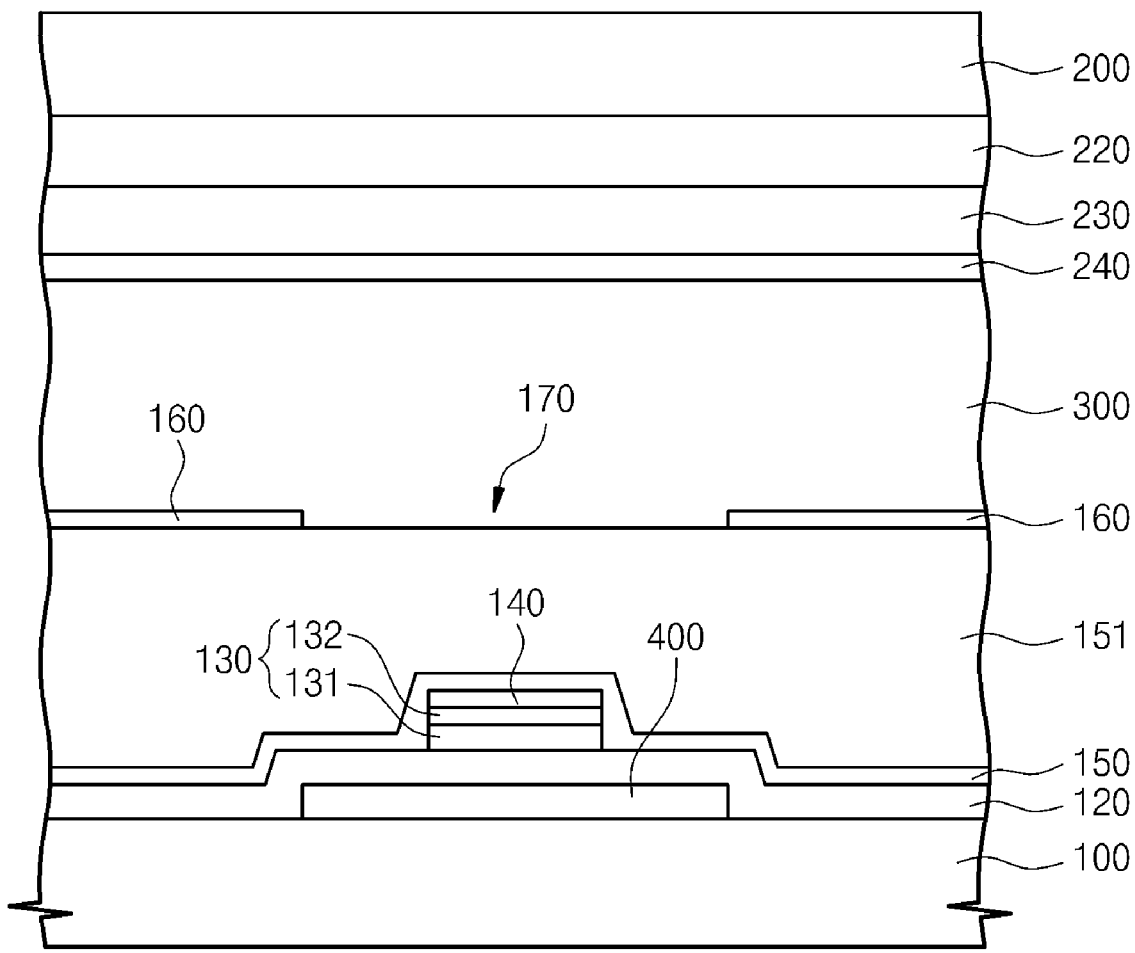

FIG. 6A and FIG. 6B are sectional views taken along lines III-III' and IV-IV' of FIG. 5.

Referring to FIG. 6A, the first gate electrode 111a, the gate insulating layer 120, the semiconductor pattern 130, the first source electrode 141a, the first drain electrode 142a, the protection layers 150 and 151, and the pixel electrode 160 are provided on the first substrate 100. The semiconductor pattern 130 vertically overlaps both the first source electrode 141a and the first drain electrode 141b on the first gate electrode 111a except for in a predetermined area where a channel is formed during the operation. This is because the same photo mask is used for the semiconductor pattern 130, the first and second source electrodes 141a and 141b, the first and second drain electrodes 142a and 142b, and the data line 140 in the manufacturing process. By employing this process, the number of photo masks used in the whole manufacturing process may be reduced so that the number of photolithography processes may also be reduced.

The light blocking layer pattern 210, the color filter 220, the overcoat layer 230, and the common electrode 240 having the domain divider 250 are provided on the second substrate 200. The domain divider 250 may be an insulating protrusion patterned on the common electrode 240.

Referring to FIG. 6B, the light blocking member 400 is formed on the first substrate 100 so as to cover the overlapping area between the data line 140 and the cut-out pattern 170. The data line 140 overlaps the semiconductor pattern 130 there below. If the data line 140 and the semiconductor pattern 130 are formed through the same photo mask as described above, in order for the data line 140 to overlap the semiconductor pattern 130, the design for the process may be changed. As a result, the thickness of the organic protection layer 151 may be slightly reduced.

If the thickness of the organic protection layer 151 is reduced, the separation distance between the data line 140 and the liquid crystal layer 300 is reduced. In this case, the liquid crystals in the area corresponding to cut-out pattern 170 may be more easily exposed to the electric field generated from the data line 140. Accordingly, the light blocking member 400 may be more important in preventing degradation of image quality in the corresponding area. The light blocking member 400, the first and second gate electrodes 111a and 111b, and the first and second gate lines 110a and 110b may include the same material, and may be formed through the same process.

Figure 7A:
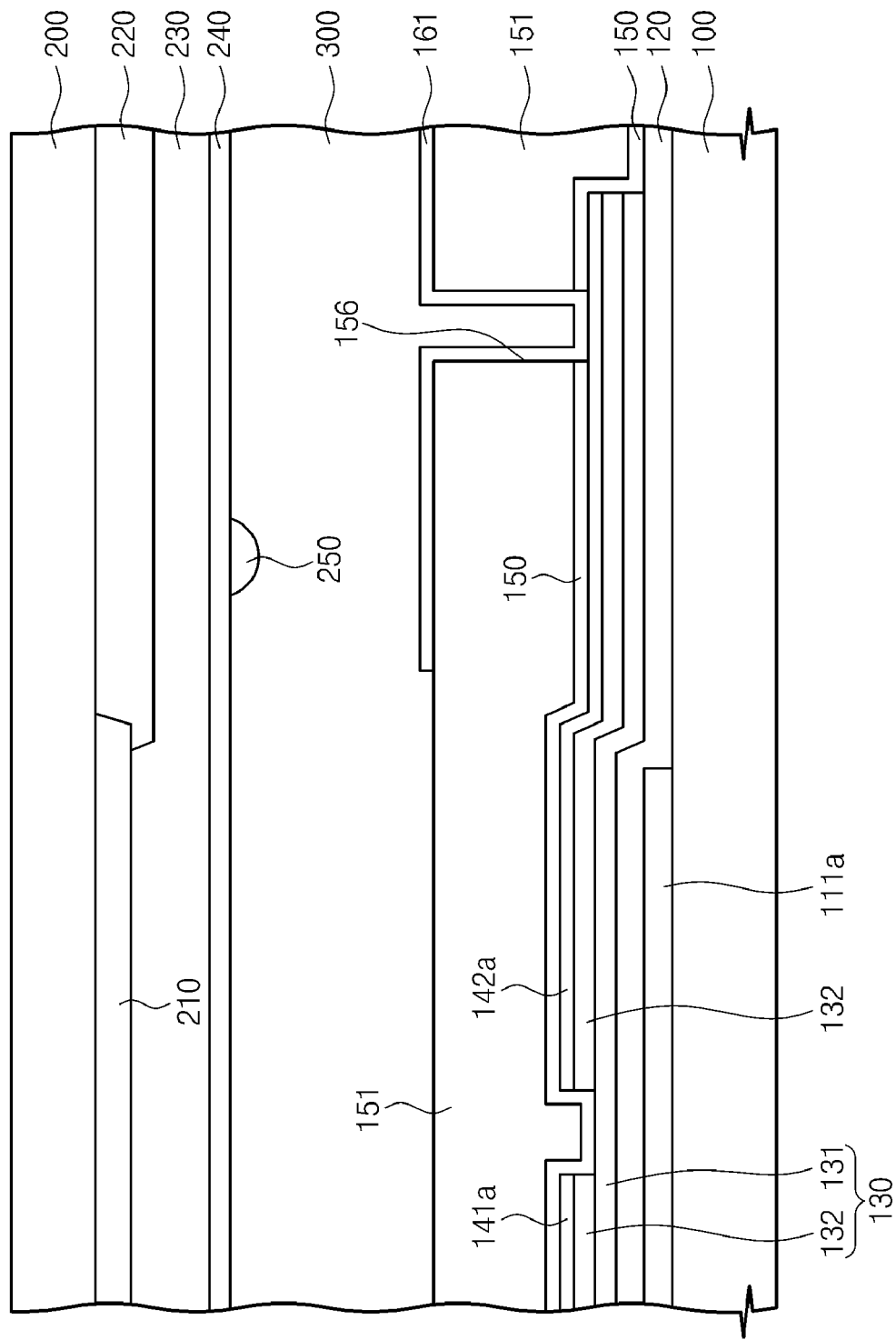
FIG. 7A and FIG. 7B are sectional views taken along lines III-III' and IV-IV' of FIG. 5 according to another exemplary embodiment of the present invention.
Figure 7B:
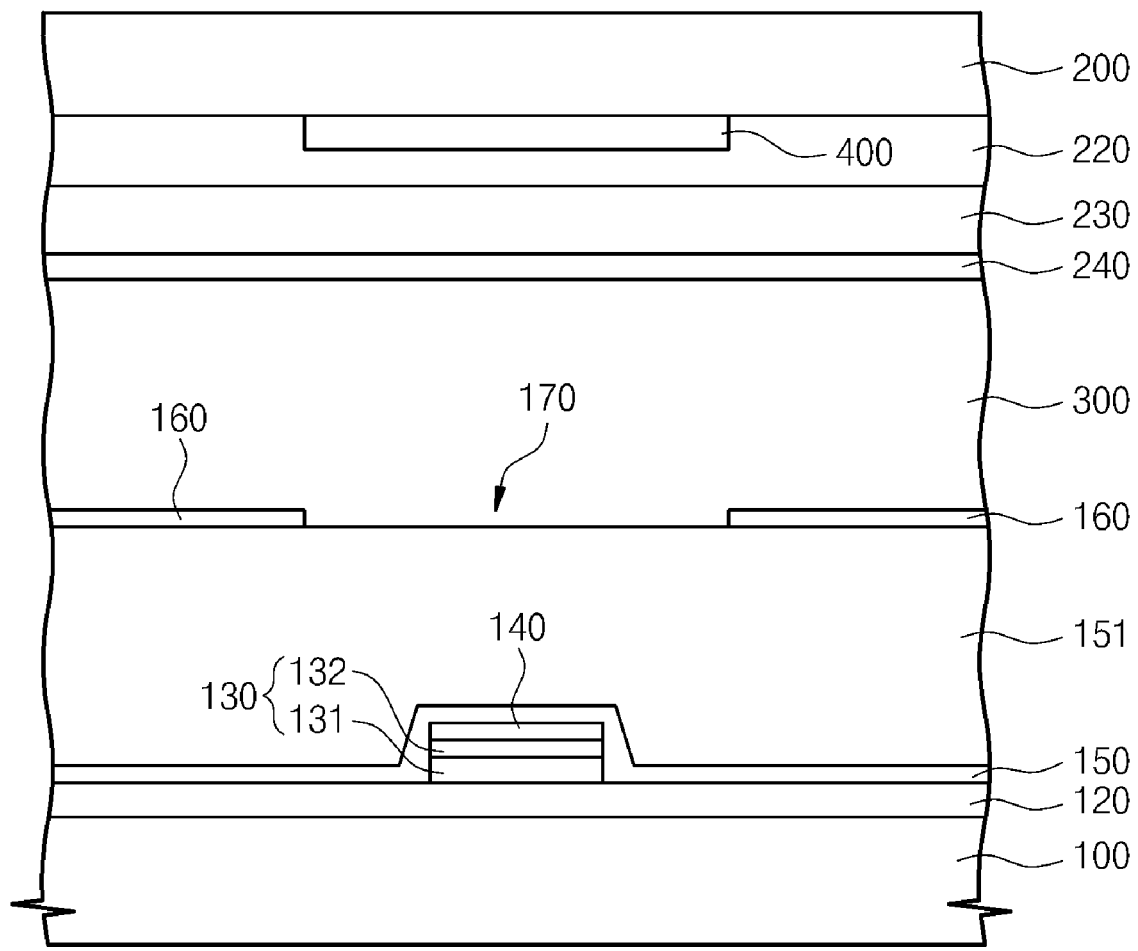

FIG. 7A and FIG. 7B are sectional views taken along lines III-III' and IV-IV' of FIG. 5 according to another exemplary embodiment of the present invention.

Referring to FIG. 7A and FIG. 7B, the data line 140 and the semiconductor pattern 130 are formed by the same photo mask so that the data line 140 overlaps the semiconductor pattern 130. The light blocking member 400 is formed on the second substrate 200. The light blocking member 400 and the light blocking layer pattern 210 may include the same material and may be formed through the same process.

Hereinafter, several exemplary embodiments employing the light blocking member 400 and preferable shapes of the light blocking member 400 will be described.

FIG. 8A, FIG. 8B, FIG. 8C, and FIG. 8D are plan views showing a portion of a pixel electrode of a liquid crystal display apparatus according to several different exemplary embodiments of the present invention. According to the present exemplary embodiments, the same reference numerals will be assigned to the elements identical to those of the prior embodiments, and a detailed description thereof will be omitted in order to avoid redundancy.

Figure 8A:
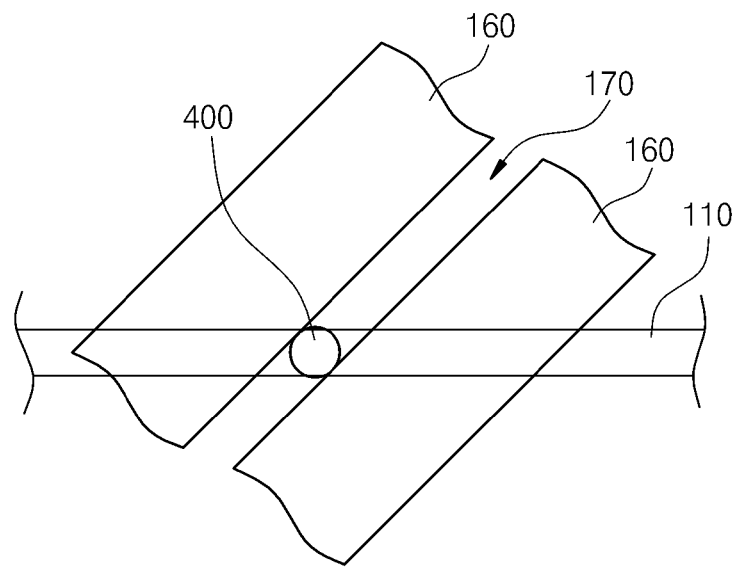
FIG. 8A, FIG. 8B, FIG. 8C, and FIG. 8D are plan views showing a portion of a pixel electrode of a liquid crystal display apparatus according to several exemplary embodiments of the present invention.

Referring to FIG. 8A, the liquid crystal display apparatus includes a gate line 110, a pixel electrode 160 having a cut-out pattern 170, and a light blocking member 400. The gate line 110 crosses the pixel electrode 160. Although the gate line 110 is generally formed outside the pixel electrode 160, the gate line 100 may overlap the pixel electrode 160. For example, the gate line 110b overlaps the pixel electrode 160 in the structure shown in FIG. 5.

As a gate signal is transmitted to the gate line 110 during the operation of the liquid crystal display apparatus, an electric field is generated from the gate line 110. The electric field generated from the gate line 110 may be applied to a liquid crystal layer in the same manner as an electric field generated from the data line 140, which may degrade image quality. In particular, since the electric field generated from the gate line 110 may be strongly applied to the liquid crystal layer in an area where there is no pixel electrode 160 due to the cut-out pattern 170, the light blocking member 400 may be provided so that an image may not be displayed in this area.

Figure 8B:
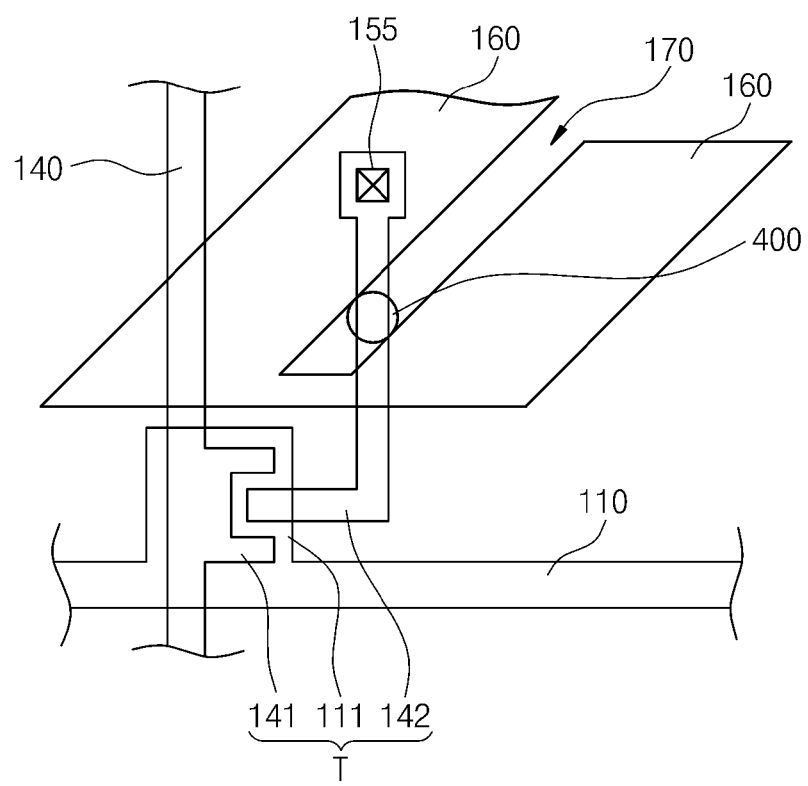

Referring to FIG. 8B, the liquid crystal display apparatus includes a thin film transistor T, a pixel electrode 160 having a cut-out pattern 170, and a light blocking member 400. The thin film transistor T includes the gate electrode 111, the source electrode 141, and the drain electrode 142, and the drain electrode 142 is connected to the pixel electrode 160 through the contact hole 155. The drain electrode 142 extends to a portion of the pixel electrode 160 connected thereto through the contact hole 155 while crossing the pixel electrode 160. The extending portion of the drain electrode 142 overlaps the cut-out pattern 170 while crossing the pixel electrode 160. An electric field may be generated from the extending portion of the drain electrode 142 and the generated electric field may affect the liquid crystal layer 300. Accordingly, the light blocking member 400 may be formed in the corresponding area.

Figure 8C:
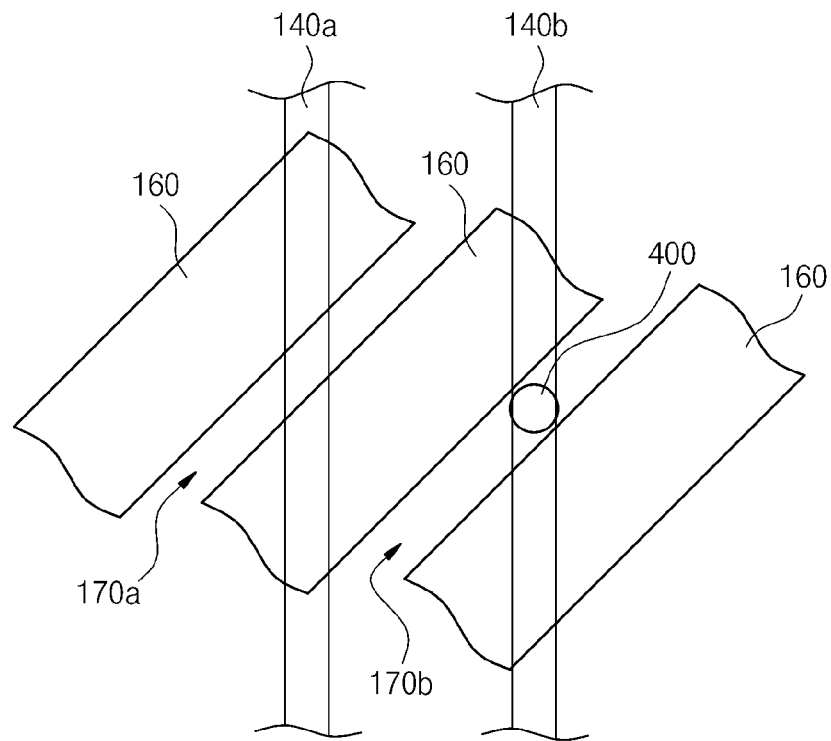

Referring to FIG. 8C, the liquid crystal display apparatus includes first and second data lines 140a and 140b, a pixel electrode 160, and a light blocking member 400. The pixel electrode 160 has cut-out patterns, and the cut-out patterns are divided into a first cut-out pattern 170a having a first width and a second cut-out pattern 170b having a second width greater than the first width. The first data line 140a overlaps the first cut-out pattern 170a having the first width, and the second data line 140b overlaps the second cut-out pattern 170b having the second width. In this case, the light blocking member 400 is formed only in an area where the second data line 140b overlaps the second cut-out pattern 170b having the second width. Since the electric field generated by the first data line 140a is mostly blocked by the pixel electrode 160, this generated electric field works only in a narrow range. If the first width is not wide, the generated electric field may be weakly applied to the liquid crystal layer 300 and the need for the light blocking member 400 may be minimal. Accordingly, the light blocking member 400 may be selectively formed only in an area having a predetermined reference width or more. This is because the light transmission area of the pixel area PA may be reduced as the area of the light blocking member 400 increases, thereby reducing the aperture ratio.

Figure 8D:
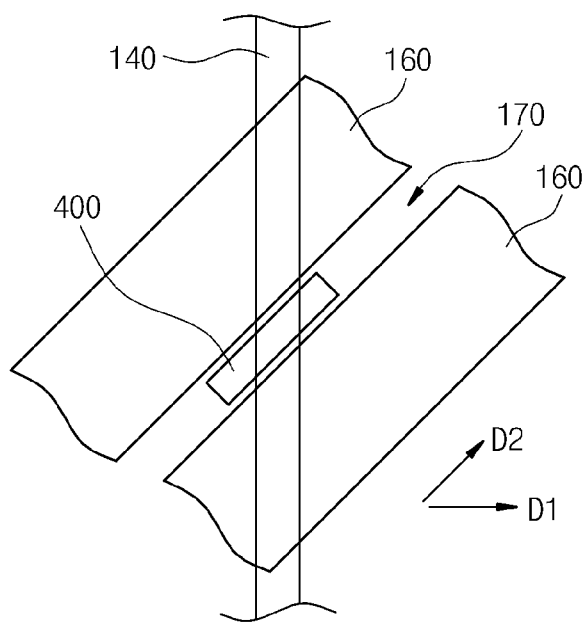

Referring to FIG. 8D, the liquid crystal display apparatus includes a data line 140, a pixel electrode 160, and a light blocking member 400. The data line 140 extends perpendicular to a first direction D1. The cut-out pattern 170 extends in a second direction D2 at an angle to the first direction D1. The light blocking member 400 has a rectangular shape that is tilted in the second direction D2, corresponding to the cut-out pattern 170.

The electric field generated from the data line 140 is mostly applied within a restricted area corresponding to the cut-out pattern 170. As a result, the electric field generated by the data line 140 may depend on the shape of the cut-out pattern 170 and the degree of image degradation is affected by the shape of the cut-out pattern 170. Accordingly, the light blocking member 400 may have a shape corresponding to the shape of the cut-out pattern 170 as shown in FIG. 8D.

According to the exemplary embodiments of the present invention, in an area where a conductive pattern, such as the data line, overlaps the cut-out pattern of the pixel electrode and the liquid crystals are abnormally aligned, light may be shielded, thereby enabling the display of a high-quality image.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display apparatus, comprising:
a first substrate comprising a pixel area;
a second substrate facing the first substrate;
a liquid crystal layer comprising liquid crystals interposed between the first substrate and the second substrate;
a pixel electrode positioned in the pixel area and comprising a cut-out pattern;
a conductive pattern arranged between the first substrate and the pixel electrode, the conductive pattern partially overlapping the cut-out pattern when viewed from a plan view;
a common electrode disposed on the second substrate; and
a light blocking member arranged on any one of the first substrate and the second substrate, the light blocking member positioned corresponding to an area in which the cut-out pattern overlaps the conductive pattern within the pixel area.

2. The liquid crystal display apparatus of claim 1, wherein the conductive pattern comprises at least one of a gate line and a data line.

3. The liquid crystal display apparatus of claim 2, wherein the gate line is disposed in a first direction substantially parallel to a short lateral side of the pixel electrode, and the data line passes through the pixel area and crosses the gate line.

4. The liquid crystal display apparatus of claim 3, wherein the pixel electrode extends in a second direction at an angle to a first direction and in a third direction symmetrical to the second direction with respect to the first direction.

5. The liquid crystal display apparatus of claim 4, wherein the light blocking member is positioned corresponding to an area in which the data line overlaps the cut-out pattern.

6. The liquid crystal display apparatus of claim 4, further comprising a light blocking layer pattern disposed on the second substrate and positioned corresponding to a boundary of the pixel area.

7. The liquid crystal display apparatus of claim 6, wherein the light blocking member is disposed on the second substrate, spaced apart from the light blocking layer pattern, and comprises the same material as the light blocking layer pattern.

8. The liquid crystal display apparatus of claim 7, wherein the second substrate comprises a color filter disposed between the light blocking member and the common electrode, the first substrate comprises a protection layer covering the data line, and the light blocking member is positioned corresponding to an area in which the data line overlaps the cut-out pattern.

9. The liquid crystal display apparatus of claim 8, wherein the first substrate further comprises a semiconductor pattern disposing between the first substrate and the data line, and the semiconductor pattern overlaps the data line.

10. The liquid crystal display apparatus of claim 7, wherein the light blocking member and the light blocking layer pattern are formed simultaneously through the same process.

11. The liquid crystal display apparatus of claim 4, further comprising a thin film transistor comprising:
a gate electrode branching from the gate line,
a source electrode branching from the data line, and
a drain electrode spaced apart from the source electrode and connected to the pixel electrode.

12. The liquid crystal display apparatus of claim 11, wherein the light blocking member comprises:

a floating electrode disposed on the first substrate, the floating electrode spaced apart from the gate electrode, and the same material as the gate electrode.

13. The liquid crystal display apparatus of claim 12, wherein the second substrate comprises a color filter disposed between the second substrate and the common electrode, the first substrate comprises a protection layer covering the data line, and the light blocking member is positioned corresponding to an area in which the data line overlaps the cut-out pattern.

14. The liquid crystal display apparatus of claim 13, wherein the first substrate further comprises a semiconductor pattern disposing between the first substrate and the data line, and the semiconductor pattern overlaps the data line.

15. The liquid crystal display apparatus of claim 12, wherein the light blocking member and the gate electrode are formed simultaneously through the same process.

16. The liquid crystal display apparatus of claim 4, wherein the pixel electrode comprises a first pixel electrode and a second pixel electrode to receive different voltages, the first pixel electrode and the second pixel electrode being spaced apart from each other.

17. The liquid crystal display apparatus of claim 16, wherein the cut-out pattern is positioned in a region between the first pixel electrode and the second pixel electrode.

18. The liquid crystal display apparatus of claim 4, wherein the cut-out pattern comprises:

a first cut-out pattern extending in the first direction;
a second cut-out pattern extending in the second direction; and
a third cut-out pattern extending in the third direction.

19. The liquid crystal display apparatus of claim 18, wherein the light blocking member covers an area where the data line overlaps the second cut-out pattern and the third cut-out pattern.

20. The liquid crystal display apparatus of claim 19, wherein the light blocking member covering the second cut-out pattern has a rectangular shape comprising a long lateral side substantially parallel to the second direction, and the light blocking member covering the third cut-out pattern has a rectangular shape comprising a long lateral side substantially parallel to the third direction.

21. The liquid crystal display apparatus of claim 19, wherein the light blocking member covering the second cut-out pattern and the third cut-out pattern has a circular shape.

22. The liquid crystal display apparatus of claim 4, wherein the common electrode comprise a domain divider dividing the pixel area into a plurality of domains.

23. The liquid crystal display apparatus of claim 22, wherein the domain divider is a cut-out pattern or a protrusion disposed on a portion of the common electrode.

24. The liquid crystal display apparatus of claim 23, wherein the domain divider comprises:

a first domain divider extending in the first direction;
a second domain divider extending in the second direction; and
a third domain divider extending in the third direction.

* * * * *